Patented Sept. 18, 1934

1,973,834

UNITED STATES PATENT OFFICE 1,973,834

CONVERSION OF HYDROCARBONS INTO HYDROCARBONS OF LOWER MOLECULAR WEIGHT

Fritz Winkler and Hans Haeuber, Ludwigshafen-on-the-Rhine, Germany, assignors to I. G. Farbenindustrie Aktiengesellschaft, Frankfort-on-the-Main, Germany No Drawing. Application January 25, 1930, Serial No. 423,537. In Germany February 5, 1929

3 Claims. (Cl. 260—170)

This invention relates to improvements in the conversion of hydrocarbons into hydrocarbons of lower molecular weight.

We have found that the conversion of hydrocarbons into hydrocarbons of lower molecular weight by cracking in the vaporous or gaseous phase, according to which products are obtained having a smaller number of carbon atoms in the molecule than the initial materials, may be effected very advantageously when it is carried out in the presence of silicon, for example, with the employment of silicon as a catalyst or of a catalyst comprising large amounts of elementary silicon. The catalyst may also be employed deposited on carriers. The silicon is preferably employed in the form of pieces or in the form of bricks or the like obtained by pressing silicon powder into moulds. The thermal treatment of the initial materials may be carried out under any pressure, for example under reduced, atmospheric or elevated pressure. As examples of elevated pressures which may be employed according to the process of the present invention may be mentioned 5, 10, 20, 50, 100 or 200 atmospheres or even higher pressures. If desired, the process may be carried out in the presence of extraneous gases or vapors such at nitrogen, methane, hydrogen, water vapor and the like.

Apart from a far reaching promotion of the splitting of the initial materials the employment of silicon as the catalyst has the effect that the reaction proceeds, even for long periods of time, without any, or without any substantial, deposition of carbon on the catalyst. This effect is especially valuable, because as is well known, it is difficult to prevent the very undesirable deposition of carbon when carrying out cracking processes. By the process according to the present invention hydrocarbons or mixtures of hydrocarbons such as pentane, ligroin and other benzines, paraffin oil, petroleums and the like may be converted in a simple manner into hydrocarbons of low boiling point, in particular gaseous hydrocarbons, without any injurious effect on the catalysts owing to the deposition of carbon during the course of the operation. The process is usually carried out at temperatures of about between 200° and 900° centigrade and preferably up to about 850° centigrade. At the lower limit the conversion may proceed rather slowly.

The following examples will further illustrate the nature of this invention but the invention is not restricted to these examples. The parts and percentages are by weight unless otherwise stated.

Example 1

4.2 liters of a gas consisting of 46.6 per cent of butane, 35.8 per cent of propane, 6.8 per cent of ethylene, 6.6 per cent of butylene and 4.2 per cent of propylene are passed hourly through a quartz tube of 16 millimeters internal diameter, which is heated over a length of about 60 centimeters to a temperature of about 700° centigrade.

In the said reaction, 35.6 per cent of the initial gases are converted into ethylene, 18.5 per cent into propylene and butylene and a small quantity of liquid hydrocarbons is formed besides.

Even after working for several days no deposition of carbon is observed.

Example 2

A mixture of 5 parts of nitrogen and 1 part of pentane is passed through a quartz tube of 16 millimeters internal diameter which is charged with pieces of silicon and which for 60 centimeters of its length is heated to 700° centigrade by an electric furnace. The introduction of the nitrogen and of the pentane or of the initial materials used in the following examples into the tube is effected by allowing the initial material to drop into the tube while the nitrogen simultaneously flows into the tube, in this case with a velocity of 20 liters per hour.

The substances thus obtained by the splitting of the pentane consist to about 80 per cent of unsaturated hydrocarbons, namely 60 per cent of ethylene, 18 per cent of propylene and 2 per cent of butylene. Although a slight incrustation of carbon having a metallic lustre is formed on the walls of the tube, the pieces of silicon remain quite clean after a period of 48 hours, and not the slightest deposition of carbon can be detected thereon. The same is the case when less diluted pentane, for example a mixture of equal proportions of pentane and nitrogen or undiluted pentane are employed as the initial materials.

Example 3

A mixture of 3 parts of nitrogen and 1 part of ligroin (boiling point about 75° centigrade) is passed through the same tube and at the same temperature specified in Example 2, the velocity of flow of the nitrogen being 10 liters per hour. The gaseous mixture of hydrocarbons obtained consists to about 40 per cent of ethylene. The catalyst in this case is also quite free from carbon after being used for a period of 48 hours.

*Example 4*

A mixture of 2 parts of nitrogen and 1 part of parafin oil is passed through the same tube at the same temperature specified in Example 2, the velocity of flow of the nitrogen being 10 liters per hour. The gaseous mixture of hydrocarbons obtained consists to about 40 per cent of ethylene. The catalyst in this case is also quite free from carbon even after being used for a period of 48 hours.

When paraffin oil vapor is led through the tube in the undiluted state, under otherwise identical conditions, 37 per cent of the oil employed is obtained as liquid hydrocarbons and 63 per cent as gaseous products. About 40 per cent of the latter are olefines of low boiling point (ethylene with a little propylene and less butylene) the remainder consisting mainly of methane besides hydrogen and ethane. The far reaching conversion of the paraffin oil, which is effected without deposition of carbon, is shewn in the following table of the boiling point ranges of the initial oil and of the condensate:

| ° centigrade | Paraffin oil | Condensate |
| --- | --- | --- |
| | Percent | Percent |
| From 35 to 100 | 3 | 21 |
| From 100 to 170 | | |
| From 170 to 250 | 4 | 23 |
| From 250 to 300 | 4 | 18 |
| From 300 to 350 | 78 | 14 |
| From 350 to 450 | 11 | 7 |
| Above 450 | | 17 |

*Example 5*

A mixture of 1 part of nitrogen and 10 parts of American petroleum is passed through the same tube at the same temperature specified in Example 2, the velocity of flow of the nitrogen being 1 liter per hour. About 50 per cent of the petroleum is converted into gaseous products. About 50 per cent of these consist of ethylene (besides a little propylene and butylene) and the remainder is mainly methane. The conversion of the petroleum is illustrated by the following table:

| Boiling point range | Petroleum | Condensate |
| --- | --- | --- |
| ° centigrade | Percent | Percent |
| From 35 to 100 | | 15.0 |
| From 100 to 150 | 2.6 | 12.0 |
| From 150 to 200 | | 9.0 |
| From 200 to 250 | 24 | 15.5 |
| From 250 to 300 | 34.7 | 9.0 |
| From 300 to 350 | 16.7 | 16.5 |
| Above 350 | 22.0 | 22.5 |

The catalyst is quite free from carbon even after being used for a period of 40 hours.

What we claim is:—

1. In the conversion of an aliphatic hydrocarbon containing at least 5 carbon atoms in the molecule into a product consisting chiefly of unsaturated hydrocarbons having a lower molecular weight by cracking in the gaseous phase, the step of subjecting the initial material to a temperature ranging between 200 and 900° C. in the presence as catalyst of a substance comprising a large amount of free elementary silicon and in the presence of a diluent gas which is inert under the conditions of working.

2. In the conversion of an aliphatic hydrocarbon containing at least 5 carbon atoms in the molecule into a product consisting chiefly of unsaturated hydrocarbons of lower molecular weight by cracking in the gaseous phase, the step of passing a mixture of said initial material and nitrogen at a temperature betwen 200° and 900° C. over a catalyst comprising a large amount of free elementary silicon.

3. A process for the conversion, by cracking, of an aliphatic hydrocarbon containing at least 5 carbon atoms in the molecule into a product consisting chiefly of unsaturated hydrocarbons having a lower molecular weight, which comprises passing a mixture of nitrogen and pentane at a temperature of about 700° C. over silicon.

FRITZ WINKLER.
HANS HAEUBER.